US006638062B1

(12) United States Patent
Davidson

(10) Patent No.: US 6,638,062 B1
(45) Date of Patent: Oct. 28, 2003

(54) SAND AND STONE SCREW HEATER

(76) Inventor: Michael P. Davidson, Innovative Ideas LLC, 25670 Paradise La., Goldsboro, MD (US) 21636

(*) Notice: Subject to any disclaimer, the term of this patent is extended or adjusted under 35 U.S.C. 154(b) by 0 days.

(21) Appl. No.: 10/242,495

(22) Filed: Sep. 13, 2002

(51) Int. Cl.[7] .............................................. B65G 45/20

(52) U.S. Cl. ........................ 432/225; 432/118; 432/62; 198/494

(58) Field of Search ............................. 432/61, 62, 74, 432/103, 118, 119, 117, 210, 211, 225, 239; 198/494, 952

(56) References Cited

U.S. PATENT DOCUMENTS 1,609,652 A 12/1926 McQueen
1,695,021 A 12/1928 Puryear
2,025,841 A 12/1935 Young
2,336,991 A 12/1943 Leveke
3,674,401 A 7/1972 Annis, Jr. et al.
3,807,558 A 4/1974 Hamm
4,504,222 A * 3/1985 Christian .................... 432/139
4,575,010 A 3/1986 Zimmerman
4,649,655 A * 3/1987 Witten ......................... 34/135
4,927,003 A * 5/1990 Swinderman et al. ....... 198/497
5,024,319 A * 6/1991 Dixon et al. ................ 198/494
5,305,533 A * 4/1994 Alexander et al. ............ 34/549
5,593,707 A 1/1997 Goe et al.
6,170,667 B1 1/2001 Bilak et al.

* cited by examiner

*Primary Examiner*—Gregory Wilson
(74) *Attorney, Agent, or Firm*—Richard C. Litman

(57) ABSTRACT

An axially rotatable materials handling apparatus for handling a mixture of solid particulate and water, includes a heater mounted on the housing that can transfer heat to the mixture to prevent or thaw frozen water inside the apparatus. The heater can be a combustible fuel heater or an electric heater. The apparatus is particularly useful in winter weather to prevent water from freezing inside the apparatus or to thaw any frozen water already present.

14 Claims, 3 Drawing Sheets

SAND AND STONE SCREW HEATER

BACKGROUND OF THE INVENTION

1. Field of the Invention

The present invention relates to axially rotatable materials handling equipment for axially moving mixtures of solid particulate and water. More particularly, the present invention relates to a heater for a sand and stone screw conveyor, log washer, or the like, which applies heat to the apparatus to prevent ice formation inside the conveyor and to thaw and remove any ice already present in the apparatus.

2. Description of the Related Art

Aggregate materials, such as sand, stone, gravel, and the like, is frequently used in the construction industries. Aggregate material may be obtained by strip mining, quarrying, dredging, or other operations. It is necessary to load aggregate materials on trucks or railway cars for transport, and to clean or separate aggregate materials from clay, soil, or other impurities. Frequently aggregate materials are loaded using screw conveyors, and may be separated and cleaned in devices known as log washers, which may have helical screws or shafts with paddles for moving the aggregate material. Typically a screw conveyor or log washer will have an open top housing, variously referred to as a box, tank, trough, tub, or stockade, with the screws being rotatably mounted in bearings in the end walls of the housing. The housing is often mounted on an incline. A problem which develops during the winter months is that water enters the open top of the housing, either from rainfall or other environmental conditions, or in the case of log washers, by being intentionally introduced as part of the process of separating and cleaning the aggregate materials, and during the winter months, the water will freeze and form ice.

When this occurs, the equipment must be stopped and the frozen water must be warmed up to thaw and be removed. Often this happens during the winter and at night, when the temperatures are at their lowest. Then, the thawing can take place simply by waiting until daylight so that heat radiated from the sun thaws the equipment. In this case, the equipment can only be used during the daylight hours.

Alternatively, hot water can be poured into the equipment to melt the ice. Another alternative is to apply heat to the outside surface of the conveyor housing using wood fires or other combustible material, or manually applied heating devices. This alternative is time-consuming and labor-intensive.

Thus, there is a need to prevent the occurrence of frozen water in the housing of axially rotatable materials handling equipment that handles mixtures of solid particulate materials and water, thereby avoiding the need to stop the equipment to thaw it.

U.S. Pat. No. 1,609,652 issued to McQueen on Dec. 7, 1926 teaches a horizontally oriented log washer.

U.S. Pat. Nos. 1,695,021 issued to Puryear on Dec. 11, 1928, and U.S. Pat. No. 2,025,841 issued to Young on Dec. 31, 1935, teach inclined twin-screw apparatus for separating solids.

U.S. Pat. No. 2,336,991 issued to Leveke on Dec. 14, 1943 teaches a single screw gravel separator.

U.S. Pat. No. 3,674,401 issued to Annis, Jr., et al. on Jul. 4, 1972 teaches a heated injection molding apparatus including an axially rotatable conveyor screw.

U.S. Pat. No. 3,807,558 issued to Hamm on Apr. 30, 1974 teaches a sand screw and log washer.

U.S. Pat. No. 4,575,010 issued to Zimmerman on Mar. 11, 1986 teaches an apparatus for spreading heated sand onto icy roadways using a set of heaters, including a wraparound heater and an axially rotatable helix. This reference is directed to an apparatus that only contains sand that is heated, whereas the inventive apparatus handles a mixture of particulate solids and water. Note that in the application of the apparatus of Zimmerman, the weather conditions are necessarily quite cold, since the road surface being treated is frozen and the sand is intended to partially melt and embed into the ice, therefore, a mixture of particulate solids and water inside the structure during its use would defeat its purpose. The present invention also differs from the patent in the removal of thawed or melted water, which is not provided for in the apparatus of the patent.

U.S. Pat. No. 5,593,707 issued to Goe et al. on Jan. 14, 1997 teaches a heated auger conveyor for feeding polymer powder to a compacting press.

U.S. Pat. No. 6,170,667 issued to Bilak et al. on Jan. 9, 2001 teaches a multi-stage screw apparatus for preparing slurries.

None of the above inventions and patents, taken either singly or in combination, is seen to describe the instant invention as claimed. Thus a sand and stone screw heater for heating the housing of a screw conveyor or log washer for solving the aforementioned problems is desired.

SUMMARY OF THE INVENTION

The invention is directed to an axially rotatable materials handling apparatus for handling mixtures of solid particulate and water, such as a screw conveyor, log washer, or the like, in which the apparatus includes a heater mounted thereon. The preferred solid particulate material conveyed, separated, or washed in the apparatus is sand and/or stone. Solids particulate materials can be continuously added to the apparatus and be conveyed continuously to the outlet by virtue of the rotation of the axially rotatable member.

During use of the apparatus outdoors in cold weather, e.g., during the winter season, water is present in the apparatus either because it is added intentionally for washing the solid particulate or because it accumulates due to atmospheric humidity or from precipitation (e.g., snow). When the surroundings temperature falls below freezing, the water present inside the apparatus often freezes in place, thereby freezing the rotating member(s) in the apparatus.

One type of heater that can be used is a burner that burns combustible fuel, such as fuel oil or natural gas. The hot combustion gases flow from the heater through a duct (conduit) that is mounted on the housing containing the axially rotatable member and the mixture being handled. Heat is transferred from the hot combustion gases in the duct to the mixture inside the housing to thaw and melt any water present.

The duct can be applied along the entire length of the housing. Also, it can be wrapped around the bottom and sides of the housing to ensure efficient heat transfer to the mixture inside.

Alternatively, the heater can be an electric resistance heater mounted onto the housing.

Accordingly, it is a principal object of the invention to provide an axially rotatable materials handling apparatus for handling a mixture of solid particulate with water, with a heater that can be actuated as needed to thaw any water frozen inside the structure housing or to prevent any water from freezing.

It is another object of the invention to provide the above apparatus with a heater that burns combustible fuel and includes a flue duct mounted on the housing to transfer heat from the combustion gases to the mixture inside the housing.

It is a further object of the invention to provide the above apparatus in which the heater is an electric resistance heater. mounted on the housing.

Still another object of the invention is to provide the above apparatus for use as a log washer or as a conveyor.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a heater mounted on an axially rotatable materials handling apparatus for handling a mixture of solid particulate material and water. An exemplary type of apparatus is a sand and stone screw used for either washing the sand/stone or for conveying the sand and stone material to another location, e.g., for loading into a truck or transferring to another materials handling or processing apparatus.

Figure 1:
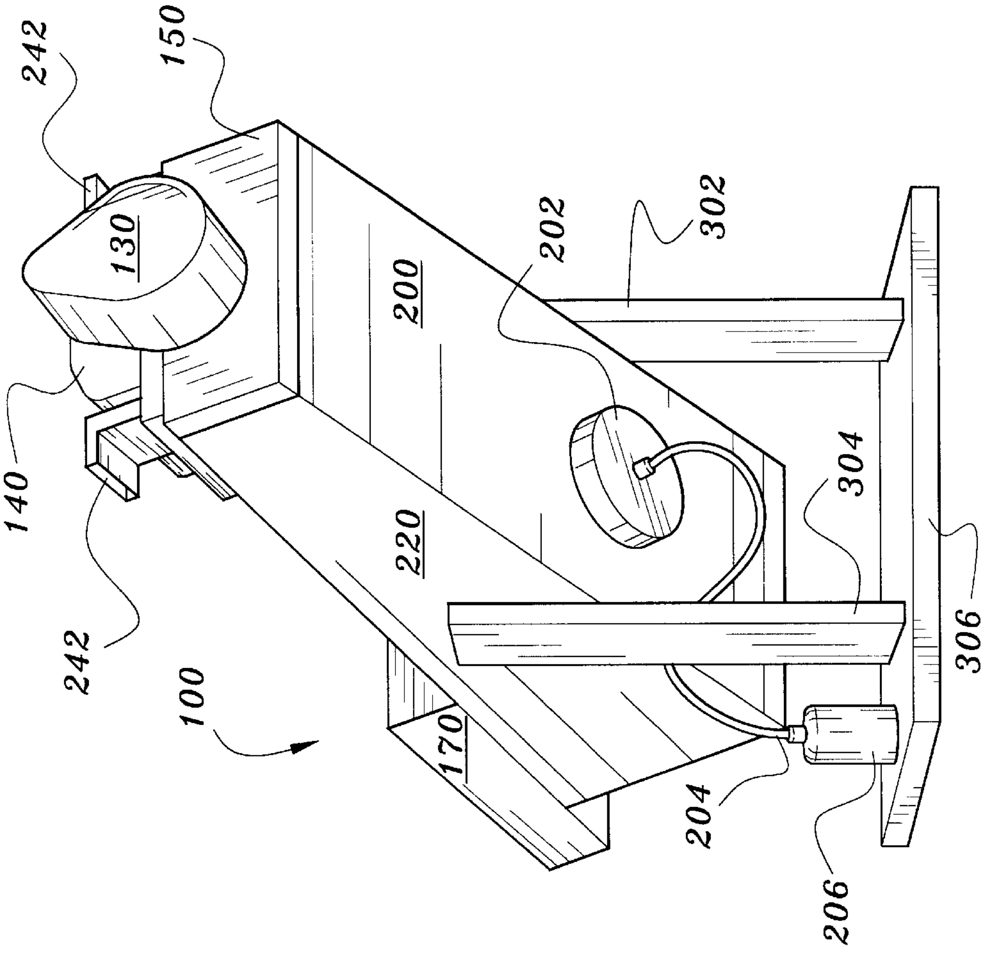
FIG. 1 is an environmental, perspective view of a sand and stone screw according to the present invention.

FIG. 1 shows a perspective view of the sand and stone screw 100. Although such screws can be used for sand and stone conveying and washing, the invention is intended to cover all types of ground mounted inclined systems that use elongated inclined rotating screw-type elements, including conveyors and log washers. Rotating elements usable in these structures can be helical screws or shafts with individual blades mounted in a spaced relationship.

The inventive structure is a heater mounted on the conveyor housing. In the perspective view of the structure in FIG. 1, a combustible fuel heater is shown. A fuel source 206 provides a combustible fuel through a line 204 to heater 202 where the fuel is mixed with air and burned to form hot combustion gases. The hot combustion gases flow though bottom ducts 200 and side ducts 210 and 220, heating the particulate/water mixture 160, and ultimately pass out exhaust 242.

The conveyor structure includes an inlet 170 for adding the solid particulate material and/or the water. Some of the particulate can fall on the internal path-defining member 120 before it enters the spaces in the rotatable member 110. The path-defining member 120 defines a portion of the path through which the particulate/water mixture flows, especially when used as a conveyor. In the case of the use of the apparatus as a washer, this feature may be omitted.

Two possible outlets can be provided, however, only one, 150, is shown at the top of the structure. This outlet can be open to permit washed sand or stone particulate to leave the apparatus, or, alternatively, it can be used as an outlet when the apparatus is used as an axial flow conveyor. A second outlet at the bottom of the structure can be provided to permit the removal of water from the apparatus.

The elongated member (e.g., screw, helix or log washer) is rotated by a motor 140 that transmits power through a chain or belt 130.

Supports, 302 and 304, and base 306 maintain the apparatus in an inclined orientation relative to the horizontal. This orientation ensures that wash water or thawed/melted water gravitates to one end of the apparatus to be removed. In the case where the apparatus is used as a log washer, the removed water can be recirculated by adding it to the top of the apparatus.

Figure 2:
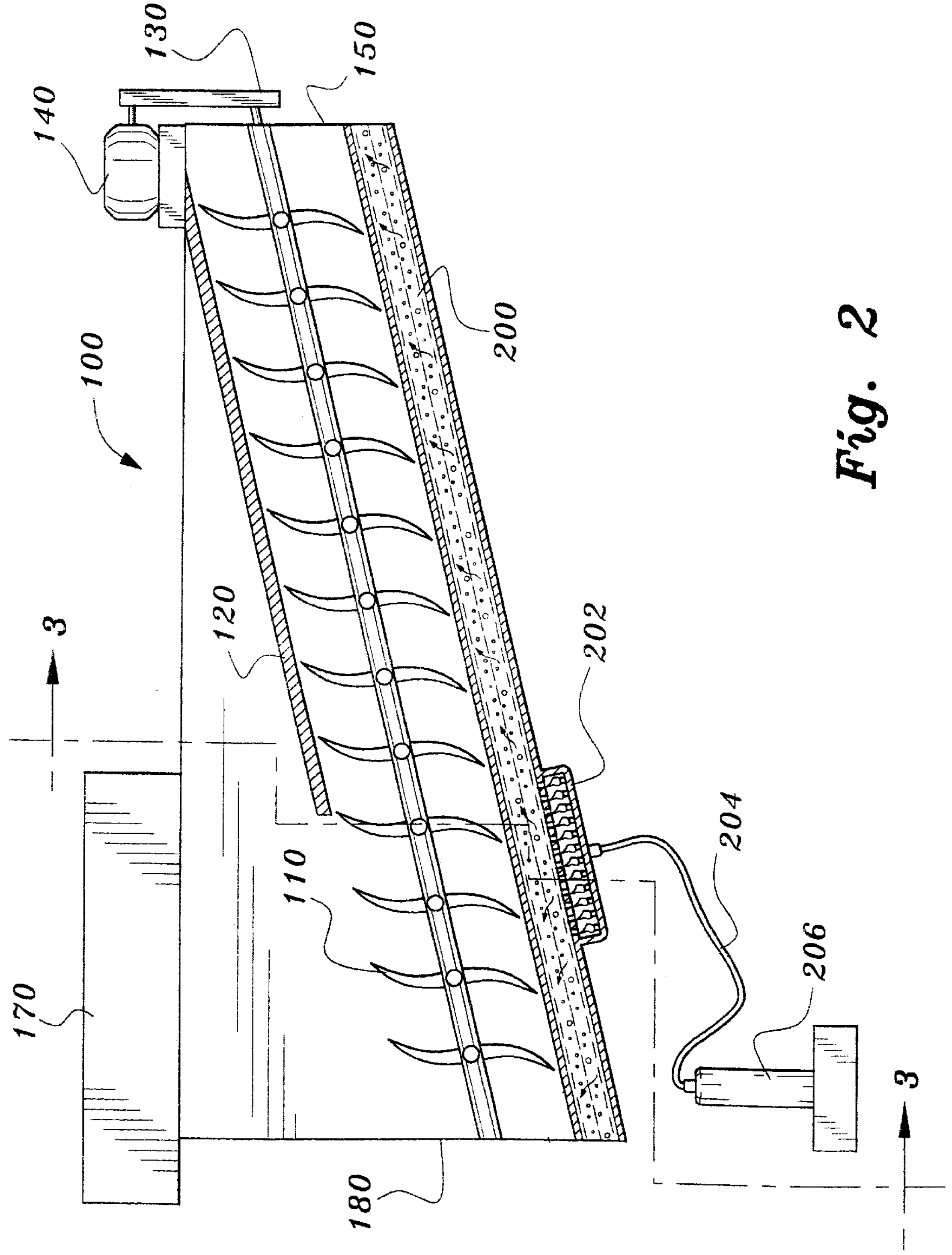
FIG. 2 is a schematic sectional side view of a sand and stone screw of the present invention.

In FIG. 2, the elongated rotating element 110 is shown with a plurality of individual blades spaced along its length. The shaft of the element 110 is rotated through a coupling 130 by a motor 140, in this case an electric motor. The coupling can be a gear coupling or a belt coupling, for example. A second outlet 180 is also shown. This outlet can be used to remove water that settles in the bottom of the apparatus.

It will be understood that the housing is typically a box-shaped housing having a bottom wall, a pair of side walls, and a pair of end walls, but no top wall. Although FIG. 2 shows the heating ducts 200, 210, and 220 formed integrally with the bottom wall and side walls of the housing, that the invention may comprise heating ducts which are an aftermarket retrofit attached to the existing bottom wall and side walls of the screw conveyor housing. Either heated combustible gases may flow in the ducts 200, 210 and 220, as shown in FIG. 2, or electric heating elements may be disposed in the ducts to heat air or a heat exchange liquid.

Figure 3:
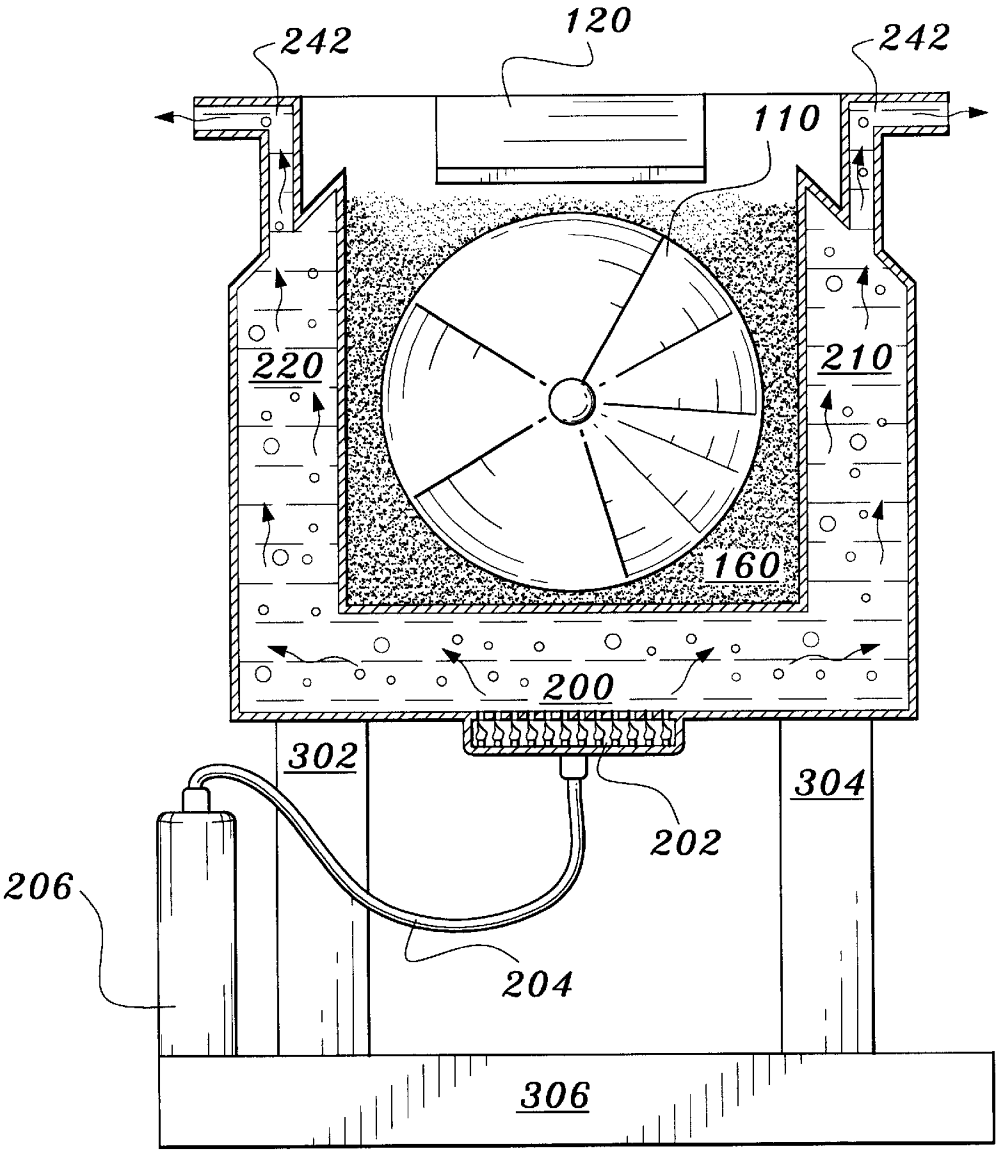
FIG. 3 is a cross-sectional view along the lines 3—3 of FIG. 2.

FIG. 3 shows a cross-sectional view of FIG. 2 showing the duct containing the combustion gases placed in a wrap-around fashion around the sides and the bottom of the apparatus housing. This arrangement ensures a wide heat transfer surface.

Although the above figures show a combustible fuel heater, an electric resistance heater can be used either as a substitute for the combustible fuel heater or in addition thereto. Exemplary types of combustible fuels that can be used in the combustible fuel heater include recycled oil, diesel fuel, natural gas, propane.

The conduit for the combustion gases mounted on the housing can be attached by welding or by bolting, as long as the duct adequately encloses the pathway of the combustion gases and ensures that heat is adequately transferred from the combustion gases to the particulate/water mixture.

The heater can be actuated by a switch located near the apparatus. In the case of a combustible fuel heater, an igniter would be needed as well.

It is to be understood that the present invention is not limited to the embodiments described above, but encompasses any and all embodiments within the scope of the following claims.

I claim:

1. An axially rotatable particulate materials handling apparatus comprising:

an elongated open-top housing capable of containing a mixture of solid particulate material and water, the housing including an inlet for the mixture and a first outlet for removal of at least a portion of the mixture;

an elongated axially rotatable member inside the housing, the member having a moving means for moving the mixture along a spiral pathway inside the housing;

means for rotating the rotatable member; and heating means for heating the housing to melt any ice formed within the housing;

wherein the mixture is continuously added to the apparatus through the inlet;

the first outlet of the housing is located at an end of the housing distal to the inlet for continuously removing at least a portion of the mixture from the apparatus; and the housing includes a second outlet located at a location proximal to the inlet for continuously removing at least a portion of the mixture from the apparatus.

2. The apparatus of claim 1, wherein the rotatable member is a screw and the apparatus is a conveyor that moves the mixture from the inlet to the first outlet.

3. The apparatus of claim 1, wherein the housing is mounted on a support, and wherein the support maintains the housing and the rotatable member in an inclined orientation relative to the horizontal.

4. The apparatus of claim 1, wherein the heating means includes a combustible fuel source, a conduit mounted on the elongated housing for providing a flow path for the combustion gases, a heater for mixing the combustible fuel with air to provide a combustible fuel/air mixture and for burning the fuel/air mixture, a flow passageway for connecting the fuel source with the heater, and an exhaust at a distal end of the conduit, wherein the burned combustible fuel/air mixture flows from the heater, through the conduit and through the exhaust, whereby heat produced by the burning of the combustible fuel/air mixture provides heat to the mixture in the elongated housing.

5. The apparatus of claim 4 wherein the conduit extends substantially along the entire length of the elongated housing.

6. The apparatus of claim 4, wherein the elongated housing includes two side panels, a top panel, and a bottom panel, the four panels defining the elongated housing, and wherein the conduit is mounted to substantially enclose the two side panels and the bottom, to thereby provide heat exchange between the burned combustion mixture and the particulate/water mixture across at least a portion of the two side panels and the bottom panel.

7. The apparatus of claim 1, wherein the moving means comprises a helix.

8. The apparatus of claim 1, wherein the moving means is a shaft and a plurality of blades mounted thereon.

9. The apparatus of claim 1, wherein the housing, the rotatable member, the means for rotating, and the heating means form a log washer.

10. The apparatus of claim 1, wherein the housing, the rotatable member, the means for rotating, and the heating means form a screw conveyor.

11. The apparatus of claim 1, further including a second axially rotatable member positioned inside the housing in a horizontally spaced relationship with respect to the first member.

12. The apparatus of claim 1, wherein the means for rotating is a motor.

13. An axially rotatable particulate materials handling apparatus comprising:

an elongated open-top housing capable of containing a mixture of solid particulate material and water, the housing including an inlet for the mixture and a first outlet for removal of at least a portion of the mixture;

an elongated axially rotatable member inside the housing, the member having a moving means for moving the mixture along a spiral pathway inside the housing;

means for rotating the rotatable member; and heating means for heating the housing to melt any ice formed within the housing, wherein the heating means includes:

a combustible fuel source;

a conduit mounted on the elongated housing for providing a flow path for the combustion gases, the conduit extends substantially along the entire length of the elongated housing;

a heater for mixing the combustible fuel with air to provide a combustible fuel/air mixture and for burning the fuel/air mixture;

a flow passageway for connecting the fuel source with the heater; and an exhaust at a distal end of the conduit;

wherein the burned combustible fuel/air mixture flows from the heater, through the conduit and through the exhaust, whereby heat produced by the burning of the combustible fuel/air mixture provides heat to the mixture in the elongated housing.

14. An axially rotatable particulate materials handling apparatus comprising:

an elongated open-top housing capable of containing a mixture of solid particulate material and water, the housing including an inlet for the mixture and a first outlet for removal of at least a portion of the mixture;

an elongated axially rotatable member inside the housing, the member having a moving means for moving the mixture along a spiral pathway inside the housing;

means for rotating the rotatable member; and heating means for heating the housing to melt any ice formed within the housing, wherein the heating means includes:

a combustible fuel source;

a conduit mounted on the elongated housing for providing a flow path for the combustion gases, wherein the elongated housing includes two side panels, a top panel, and a bottom panel, the four panels defining the elongated housing, and the conduit is mounted to substantially enclose the two side panels and the bottom, to thereby provide heat exchange between the burned combustion mixture and the particulate/water mixture across at least a portion of the two side panels and the bottom panel;

a heater for mixing the combustible fuel with air to provide a combustible fuel/air mixture and for burning the fuel/air mixture;

a flow passageway for connecting the fuel source with the heater; and an exhaust at a distal end of the conduit;

wherein the burned combustible fuel/air mixture flows from the heater, through the conduit and through the exhaust, whereby heat produced by the burning of the combustible fuel/air mixture provides heat to the mixture in the elongated housing.

* * * * *